United States Patent [19]
Kennedy

[11] Patent Number: 5,845,258
[45] Date of Patent: *Dec. 1, 1998

[54] STRATEGY DRIVEN PLANNING SYSTEM AND METHOD OF OPERATION

[75] Inventor: Brian M. Kennedy, Coppell, Tex.

[73] Assignee: i2 Technologies, Inc., Dallas, Tex.

[*] Notice: This patent issued on a continued prosecution application filed under 37 CFR 1.53(d), and is subject to the twenty year patent term provisions of 35 U.S.C. 154(a)(2).

[21] Appl. No.: 491,168

[22] Filed: Jun. 16, 1995

[51] Int. Cl.[6] .................................................. G06F 17/60
[52] U.S. Cl. .......................................... 705/8; 364/468.06
[58] Field of Search ..................................... 395/207, 208, 395/209; 364/468.06, 468.08, 468.12; 705/7, 8, 9; 706/45, 903, 906

[56] References Cited

U.S. PATENT DOCUMENTS

| | | | |
|---|---|---|---|
| 4,209,845 | 6/1980 | Berger et al. | 395/800 |
| 4,611,280 | 9/1986 | Linderman | 395/800 |
| 4,611,310 | 9/1986 | Durbin | 365/230.01 |
| 4,827,423 | 5/1989 | Beasley et al. | 364/468.02 |
| 5,016,170 | 5/1991 | Pollalis et al. | 705/7 |
| 5,089,970 | 2/1992 | Lee et al. | 364/468.02 |
| 5,093,794 | 3/1992 | Howie et al. | 364/468.06 |
| 5,128,860 | 7/1992 | Chapman | 364/468.05 |
| 5,128,861 | 7/1992 | Kagami et al. | 395/210 |
| 5,148,370 | 9/1992 | Litt et al. | 364/468.1 |
| 5,175,857 | 12/1992 | Inoue | 395/800 |
| 5,216,593 | 6/1993 | Dietrich et al. | 395/167 |
| 5,216,612 | 6/1993 | Cornett et al. | 364/468.02 |
| 5,218,700 | 6/1993 | Beechick | 395/898 |
| 5,233,533 | 8/1993 | Edstrom et al. | 364/468.09 |
| 5,237,497 | 8/1993 | Sitarski | 395/208 |
| 5,241,465 | 8/1993 | Oba et al. | 395/208 |
| 5,280,425 | 1/1994 | Hogge | 395/898 |
| 5,287,267 | 2/1994 | Jayaraman et al. | 395/210 |
| 5,303,144 | 4/1994 | Kawashima et al. | 395/208 |
| 5,303,147 | 4/1994 | Oba et al. | 395/208 |
| 5,321,610 | 6/1994 | Breslin | 395/209 |
| 5,331,545 | 7/1994 | Yajima et al. | 395/208 |
| 5,369,570 | 11/1994 | Parad | 395/208 |
| 5,432,887 | 7/1995 | Khaw | 395/11 |
| 5,442,561 | 8/1995 | Yoshizawa et al. | 364/468.06 |
| 5,463,555 | 10/1995 | Ward et al. | 364/468.02 |
| 5,517,404 | 5/1996 | Biber et al. | 364/138 |
| 5,615,109 | 3/1997 | Eder | 395/208 |

FOREIGN PATENT DOCUMENTS

| | | |
|---|---|---|
| 0231552A1 | 12/1986 | European Pat. Off. . |
| 0425405A | 8/1990 | European Pat. Off. . |
| 0466089A2 | 7/1991 | European Pat. Off. . |
| 0466090A2 | 7/1991 | European Pat. Off. . |
| 0467597 | 7/1991 | European Pat. Off. ........ G06F 15/21 |
| 0467597A2 | 11/1991 | European Pat. Off. ........ G06F 15/21 |
| 0467597A3 | 11/1991 | European Pat. Off. ........ G06F 15/21 |
| 0 514 101 A2 | 11/1992 | European Pat. Off. . |

*Primary Examiner*—Joseph Thomas
*Attorney, Agent, or Firm*—Baker & Botts, L.L.P.

[57] ABSTRACT

A strategy driven planning system (10) is provided that includes a plan (14) defining a scheduled operation of a user environment. An environment (16) defines behavior and constraints of the user environment. A plurality of strategies (20) each defining a plan domain (22), problem selection criteria (24), plan optimality criteria (28), and termination criteria (32). A planning engine (12) is coupled to the plan (14), the plurality of constraints (16) and the plurality of strategies (20). The planning engine (12) is operable to identify a plurality of problems (18) by comparing the plan (14) to the behavior and constraints defined by the environment (16) and is operable to adjust the plan (14) according to a selected strategy. A user interface (28) is coupled to the planning engine (12). The user interface (28) is operable to allow a user to interact with the planning engine (12) in order to adjust the plan (14) and the environment (16) and to select and initiate execution of a selected strategy.

29 Claims, 2 Drawing Sheets

STRATEGY DRIVEN PLANNING SYSTEM AND METHOD OF OPERATION

CROSS REFERENCE TO RELATED APPLICATIONS

This application is related to the following applications which are incorporated by reference herein:

U.S. application Ser. No. 08/491,167, filed Jun. 16, 1995, and entitled SYSTEM AND METHOD FOR MANAGING ATP.

U.S. application Ser. No. 08/491,153, filed Jun. 16, 1995, and entitled EXTENSIBLE MODEL NETWORK REPRESENTATION SYSTEM FOR PROCESS PLANNING.

U.S. application Ser. No. 08/491,121, filed Jun. 16, 1995, and entitled INTERACTIVE REPORT GENERATION SYSTEM AND METHOD OF OPERATION.

TECHNICAL FIELD OF THE INVENTION

This invention relates in general to the field of electronic systems, and more particularly to a strategy driven planning system and a method of operation.

BACKGROUND OF THE INVENTION

A typical goal of planning and scheduling processes is to generate a plan that is feasible in that the plan can be performed in the real world and that is as close as possible to ideal or optimal, as defined by optimality criteria or an optimization function. Many conventional planning applications and processes achieve this by building up a feasible plan that will be near ideal without permitting an infeasible plan to exist.

A few conventional planning applications have instead started with an infeasible plan that is very close to ideal and then tried to remove infeasibilities in such a way that the plan moves as little as possible from ideal. This process is continued until all infeasibilities have been eliminated.

Most conventional planning packages are designed to be good at taking the current state and the desired output and then generating a near-optimal plan from scratch. However, computing the optimal plan is often not the goal. Rather, what often happens is that there is an existing plan in place, something occurs that is not consistent with the existing plan (e.g., a machine breaks, a supplier is late, a new huge order is placed), and the goal is primarily to adjust the existing plan as little as possible in order to restore the plan to a feasible one and secondarily to make that plan as desirable as possible.

This latter need to return to feasibility is more consistent with planning by removing infeasibilities than with planning by starting from scratch and building up a feasible plan.

Another issue that often arises is that all the information about the planned system, including what is truly feasible, and the information about the plan goals, the real definition of optimal, are rarely fully modeled in the planning application. Thus, there exists information about which the human planners know and must inject into the planning process themselves. Further, there can be planning problems that are computationally beyond what can be done effectively and consistently by automated processes, but that are capable of solution by an experienced human planner. However, most conventional planning software assumes that the software has been told all pertinent information about the planned system and plan goals.

In addition, human planners tend to work on an exception basis. They do not, and often can not, deal with the entire plan at once. The vastness of most planning problems is general beyond a human planner's mental capacity. Thus, it is desirable for the planning application to deal with most of the planning problem, but to involve the human planner at critical points where needed. It is desirable to provide a planning application that not only plans intelligently, but also cooperates intelligently with human planners and coordinates the efforts of those human planners.

Human planners should also remain in control of the planning application if the planners are to trust the planning application and be able to cooperate with it. Thus, it is desirable for a planning application to allow the human planner to drive the planning process and to communicate what is the best thing for the application to do next, what the application should not do, and when the application should stop.

SUMMARY OF THE INVENTION

In accordance with the present invention, a strategy driven planning system and method of operation are provided that substantially reduce or eliminate problems and disadvantages with prior planning systems.

According to one embodiment of the present invention, a strategy driven planning system is provided that includes a plan defining a scheduled operation of a user environment. An environment defines behavior and constraints of the user environment. A plurality of strategies each define a plan domain, problem selection criteria, plan optimality criteria, and termination criteria. A planning engine is coupled to the plan, the plurality of constraints and the plurality of strategies. The planning engine is operable to identify a plurality of problems by comparing the plan to the behavior and constraints defined by the environment and is operable to adjust the plan according to a selected strategy. A user interface is coupled to the planning engine. The user interface is operable to allow a user to interact with the planning engine in order to adjust the plan and the environment and to select and initiate execution of a selected strategy.

A technical advantage of the present invention is the cooperative integration of manual and automated planning and integration across successive planning efforts of an ongoing planning process.

A further technical advantage of the present invention is the definition and use of strategies, including a plan domain, problem selection criteria, change selection criteria, plan optimality criteria, search criteria, termination criteria and sub-strategies, to automate resolution of problems identified in a given plan. These strategies can be invoked manually or in multi-phase strategies by a user of the planning system in order to automate resolution of infeasibilities and progress towards an optimal plan.

Another technical advantage of the present invention is the provision of strategies that allow a human planner to specify to the process of what to do next, what not to do next, how optimal is defined, and when to stop. In addition, sub-strategies allow human planners to create full scripts to coordinate the planing process. The problem-oriented nature highlights exceptions for the human planner to address. Further, the automated processes also address the exceptions in the same sort of flow a human planner would use. This makes it transparent and understandable to a human planner which are difficult properties to achieve in such complex processes but are very valuable for such cooperative applications.

BRIEF DESCRIPTION OF THE DRAWINGS

A more complete understanding of the present invention and advantages thereof may be acquired by reference to the following description taken in conjunction with the accompanying drawings in which like reference numbers indicate like features and wherein.

DETAILED DESCRIPTION OF THE INVENTION

Strategy Driven Planning System

Figure 1:
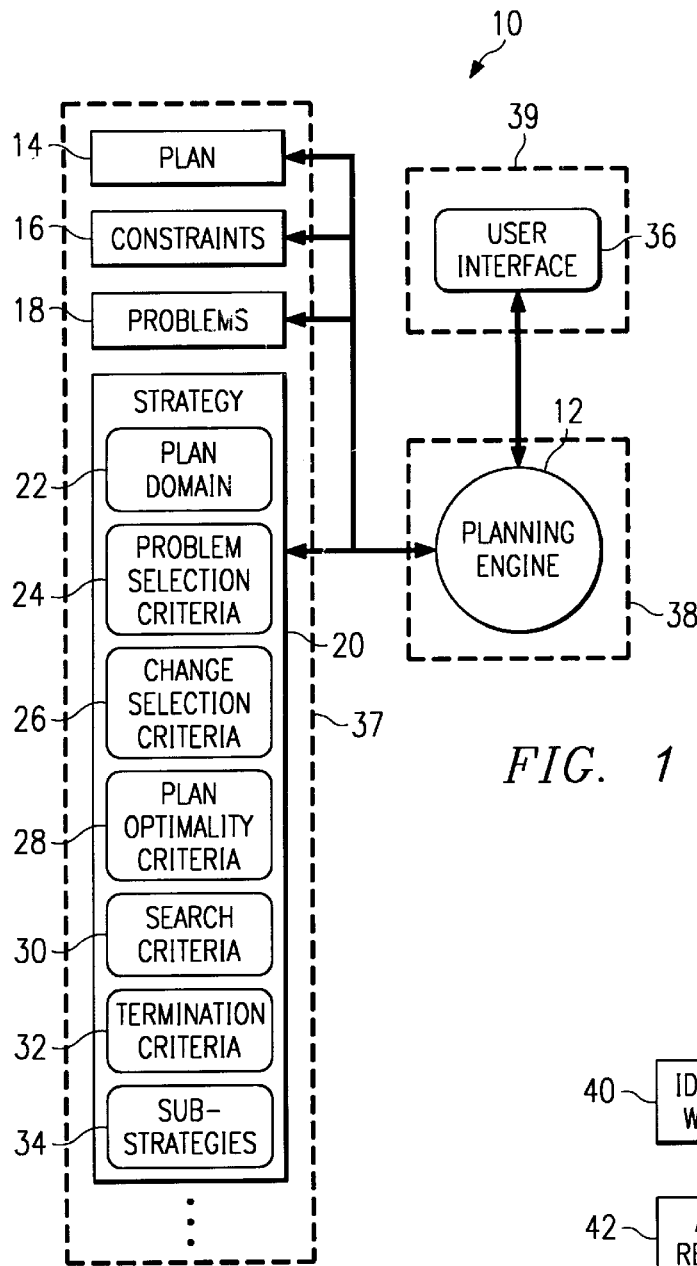
FIG. 1 is a block diagram of a strategy driven planning system constructed according to the teachings of the present invention.

FIG. 1 is a block diagram of a strategy driven planning system, indicated generally at 10, constructed according to the teachings of the present invention. Planning system 10 includes a planning engine 12. Planning engine 12 is coupled to a plan 14, an environment 16 and problems 18. Planning engine 12 is also coupled to at least one strategy 20. Strategy 20 comprises a plan domain 22, problem selection criteria 24, change selection criteria 26, plan optimality criteria 28, search criteria 30, termination criteria 32, and sub-strategies 34. Planning engine 12 is further coupled to a user interface 36.

In the illustrated embodiment of the present invention, planning system 10 comprises a computer software system operable to be executed by a digital computer. In this embodiment, a data storage device 37 stores data representing plan 14, environment 16, problems 18 and each strategy 20. Data storage device 37 can comprise a magnetic storage device, a memory or other data storage device. Further, data representing plan 14, environment 16, problems 18 and each strategy 20 can be stored by the same or different data storage devices. In the embodiment of FIG. 1, an execution memory 38 is operable to hold planning engine 12 for execution by a processor in a digital computer. Execution memory 38 can comprise a memory device or other such execution memory. Also in this embodiment, user interface 36 is displayed to a user using a display 39 connected to the processor of the digital computer.

In operation, planning system 10 allows a user to execute automated problem resolution processes cooperatively with manual planning efforts. A user is enabled to automate sets of desired adjustments or other changes defined by strategies in order to resolve problems with a given plan.

Plan 14 represents a current plan for a user environment. In the illustrated embodiment of the present invention, plan 14 represents a plan for a manufacturing environment. Environment 16 represents limitations on the function and operation of the user environment including constraints and behaviors of the environment. In the manufacturing environment, constraints include such things as limitations of capacity, material availability and due date of shipments. At the initiation of a planning process, plan 14 can comprise a plan for the user environment that can be improved by the user through use of planning system 10. According to the teachings of the present invention, plan 14 can be allowed to violate constraints and behaviors of environment 16 defining the user environment.

Planning engine 12 accesses and receives plan 14 and environment 16. Planning engine 12 can compare plan 14 to environment 16 to generate problems 18. Problems 18 comprise a list of each instance where plan 14 violates constraints and behaviors of environment 16. Constraints and behaviors of environment 16 can be defined in as much detail as necessary for a given planning application.

Each strategy 20 includes a plan domain 22, problem selection criteria 24, change selection criteria 26, plan optimality criteria 38, search criteria 30, termination criteria 32, and sub-strategies 34. Each strategy 20 provides a definition of a problem resolution process for execution by planning engine 12 to modify plan 14 in order to reduce problems 18. Plan domain 22 defines a domain of problems 18 that is to be addressed by strategy 20. Problem selection criteria 24 define criteria for selecting a subset of problems to be addressed. Change selection criteria 26 define criteria for selecting changes to execute in order to resolve problems selected according to plan domain 22 and problem selection criteria 24.

For example, plan domain 22 may define as a domain each painting machine in a manufacturing process. Problem selection criteria 24 may define, as criteria for selecting problems, the over-utilization of a painting machine by greater than ten percent. Finally, change selection criteria 26 may define possible changes such as moving back a schedule or using overtime, but may rule out other changes such as moving a schedule outward in time. This example of strategy 20, as a whole, would define a problem resolution process strategy for using schedule changes and overtime to resolve over-utilization by greater than ten percent of painting machines in the user environment.

Each strategy 20 also includes plan optimality criteria 28 that determine whether changes increase or decrease the optimality of the plan. Each strategy 20 includes search criteria 30 to allow location of problems to be resolved by changes. Termination criteria 32 define when strategy 20 has completed and should end modification of the plan. For example, the user may define a formula computed from throughput, marginal cost, profit margin, inventory, and such, to indicate optimality. The planning process to eliminate problems 18 would try to optimize the termination criteria 32.

Lastly, sub-strategies 34 define additional strategies that are subsets of strategy 20 and operate under strategy 20. For example, a user may want to first resolve all problems in a "melting" area, then move downstream to a "packaging" area and resolve all problems. The user may then pause for manual evaluation of using overtime in a "stamping" area and then resolve problems in "rolling" and "stamping" areas. Such planning flows are often found to produce consistently good results. The sub-strategies allow such flows to be recorded and used to coordinate a planning effort.

Planning engine 12 includes user interface 36 to allow interchange with a user of planning system 10. User interface 36 allows a user to control operation of planning engine 12. A user can access details of plan 14 and environment 16. User interface 36 also can display problems 18 and each strategy 20 to a user. A user can control planning engine 12 to resolve problems 18 in order to successively adjust plan 14 such that plan 14 approaches an optimum plan.

User interface 28 allows a user to control planning engine 12 to perform a number of tasks. A user may control planning engine 12 in order to directly change plan 14. Similarly, a user may control planning engine 12 to directly change environment 16. Consequently, a user may reduce problems 18 by altering plan 14 and environment 16. For example, a paint machine may have a normal setting and a fast setting. The user environment, under normal conditions, runs the painting machine in its normal setting. Thus, environment 16 is defined assuming each painting machine would run at its normal setting. Under this assumption, plan 14 may generate a number of problems in problems 18 due to over-utilization of the paint machines. A user could change environment 16 such that one or more of the painting paint machines operates at its fast setting. This adjustment to environment 16 may reduce problems 18 because plan 14 no longer over-utilizes the paint machines.

A user is enabled by planning system 10, to manually or automatically resolve problems 18. To manually resolve problems 18, a user can make changes to plan 14 and environment 16. Planning engine 12 reacts to such changes by generating a new list of problems 18. In an automatic mode, a user can select a strategy 20 for execution by planning engine 12. Planning engine 12 then executes strategy 20, as defined by plan domain 22, problem selection criteria 24, change selection criteria 26, plan optimality criteria 28, search criteria 30, termination criteria 32, and sub-strategies 34, in order to attempt to resolve problems 18. Strategy 20 provides an automated process for changing plan 14 to reduce problems 18. A user can use planning system 10 to perform both manual and automatic problem resolution in order to successively develop plan 14 towards an optimal plan.

Problems 18 comprise both problems with feasibility and desirability of plan 14. Feasibility problems are situations where it is physically impossible (or at least wholly unacceptable) for the plan to be followed. Desirability problems are situations where the plan is less profitable, less efficient, less productive, or otherwise less than desired. Reduction of these problems generally comprises reducing the number of problems that exist, but "reducing problems" can be defined differently according to different implementations.

In general, resolution of problems 18 in plan 14 begins with a choice of what problems to resolve first. Planning changes are then selected that may reduce the problems to be resolved. Changes include such things as running an operation earlier or later, running an operation on a different machine, running a different operation, obtaining a product through different means, expediting a set of operations, and splitting operations. Further, these changes can be limited according to criteria such as a limitation as to possible changes and the amount of change a change can make. According to the teachings of the present invention, this process is followed whether a user makes changes manually or automatically through the use of defined strategies.

Problem Resolution Process

Figure 2:
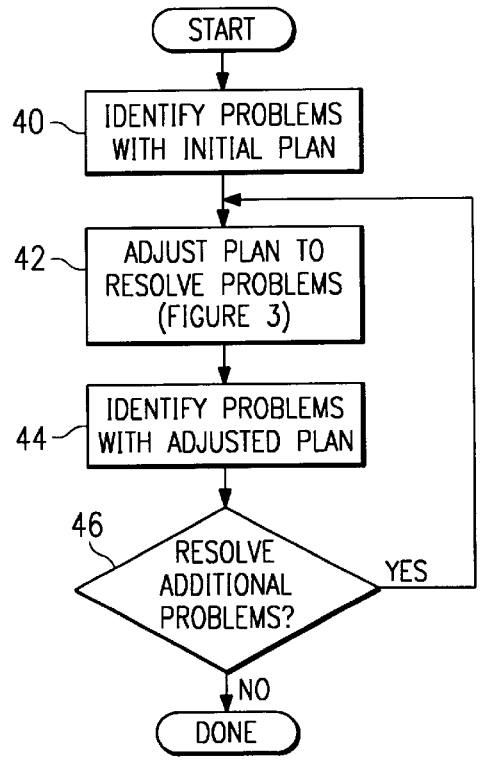
FIG. 2 is a flow chart of a problem oriented planning process according to the teachings of the present invention.

FIG. 2 is a flow chart of a problem oriented planning process according to the teachings of the present invention. FIG. 2 illustrates a process by which planning system 10 of FIG. 1 can be utilized to successively reduce problems 18 in order to resolve plan 14 into an acceptable plan.

In step 40, the planning system identifies problems with an initial plan. In step 42, the current plan is adjusted to resolve problems. This adjustment can occur either manually through interchange by a user or automatically according to strategies invoked by a user. One embodiment of this adjustment process is described in more detail with respect to FIG. 3. In step 44, the planning system identifies problems with the current plan after adjustments have been made in step 42.

The plan is evaluated to determine whether additional problems should be resolved in step 46. This evaluation can be performed either by the planning system or can be based upon a user decision. If additional problems are to be resolved, the process continues at step 42 and more adjustments are made. If no additional problems are to be resolved, then the planning system has completed processing the plan.

Strategy Execution Process

Figure 3:
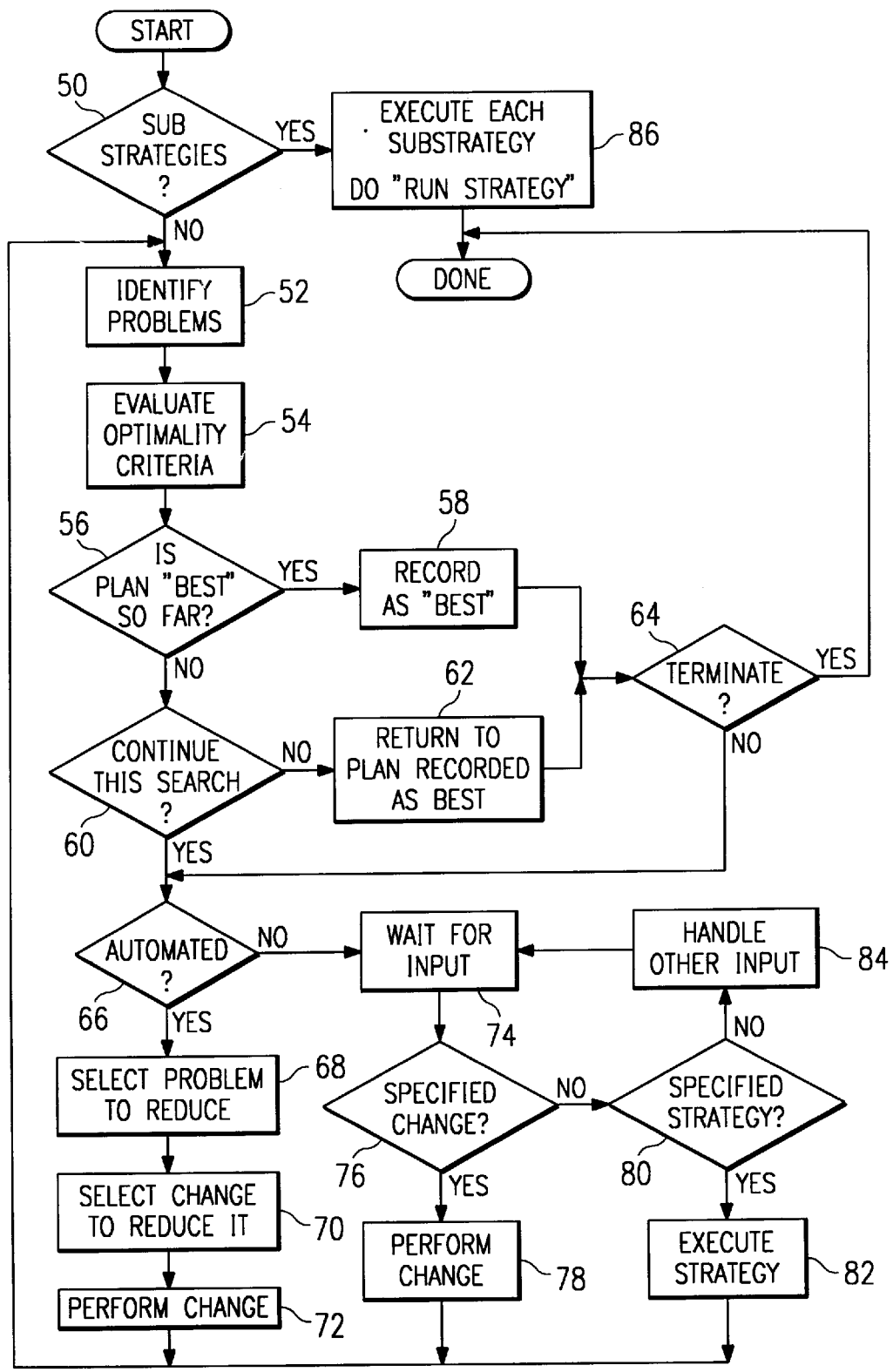
FIG. 3 is a flow chart of a strategy driven planning process, including manual strategies that involve human planner input and involvement, according to the teachings of the present invention.

FIG. 3 is a flow chart of a strategy driven planning process integrating manual and automatic problem resolution according to the teachings of the present invention. The process of FIG. 3 further defines step 42 of FIG. 2. A user of the planning system can invoke execution of a strategy automatically to adjust the current plan or perform manual adjustments to the current plan.

In step 50, the planning system determines whether the user desires to invoke sub-strategies for execution within an automatic strategy. Each strategy and sub-strategy is defined by a plan domain, problem selection criteria, change selection criteria, plan optimality criteria, search criteria, and termination criteria as described above. Execution of a selected strategy generally includes selecting problems to resolve and changes to perform and adjusting the current plan according to selected changes in order to resolve selected problems. After the strategy has been executed, the planning system has completed the plan adjustment step and continues at step 44 of FIG. 2.

After step 50, if no sub-strategies are to be executed, the planning system identifies problems with the plan in step 52. The planning system uses the plan domain and problem selection criteria defined by the strategy in identifying problems. Then, in step 54, the planning system evaluates the plan optimality criteria. Based upon that evaluation, the planning system determines, in step 56, whether the plan is the "best" plan so far. If so, the plan is recorded as the "best" plan in step 58. If the plan is not the "best" plan so far, the planning system checks whether to continue the current search in step 60. If not, in step 62, the planning system returns to the plan recorded as "best." In step 64, the planning system determines whether or not to terminate the strategy using the termination criteria. If so, the planning system has completed executing the given strategy. If not, the planning system continues at step 66. In addition, if the answer in step 60 was "YES," the planning system continues at step 66.

In step 66, the planning system checks whether the strategy is an automated strategy. If so, the planning system, in step 68, selects a problem to reduce. Then, in step 70, the planning system selects a change to use to reduce the selected problem. In step 72, the planning system then performs the change. After step 72, the planning system returns to step 52 to identify problems with the changed plan.

If, in step 66, the strategy is not automated, then the planning system waits for user input in step 74. After user input, the planning system determines whether a change has been specified in step 76. If so, the planning system performs the specified change in step 78, and then returns to step 52 to identify problems with the changed plan. If, in step 76, no change is specified, then, in step 80, the planning system determines whether a strategy has been specified. If so, the planning system executes the strategy in step 82. This execution of the strategy is accomplished as described above. If a strategy is not specified, then after step 80, the planning system handles the user input in step 84. The planning system then returns to step 74 to wait for further user input.

Returning to step 50, if sub-strategies are to be executed, then the planning system continues at step 86 and executes each sub-strategy. The execution of each sub-strategy follows the same flow as described above with respect to a single strategy.

As an example, the problem selection criteria of a strategy may be defined to include the occurrence of a planned use of paint in a quantity that is five percent in excess of available paint. The problem selection criteria may also define the highest over-use of paint as the most critical problem. The change selection criteria may define allowed changes to include placing orders for more paint and reducing the amount of paint used by a process. As part of the plan modification process, it may be acceptable to allow a larger number of problems at some points but demand fewer and fewer problems as the plan is processed. The definition of a strategy could allow a planning system to select problems with planned usage of paint and attempt to resolve those problems using allowed changes.

In the manner described with respect to FIG. 3, the planning system iterates through the problems and allowed changes until problems are adequately reduced and the problem subset is resolved. This automatic resolution of problems is enabled by the definition of strategies and integration of manual and automatic changes according to the teachings of the present invention.

Operation of Planning System

According to the teachings of the present invention, a strategy driven planning system is provided that allows a user to execute automated strategies cooperatively with manual planning efforts in order to resolve problems with a current plan. The strategies enable automation of sets of changes the user may want to perform in order to successively adjust the current plan to approach an optimum plan. The planning system of the present invention provides superior planning resolution based upon the higher speed and efficiency and more detailed analysis made possible by a digital computer. Those benefits are coupled with a high degree of cooperation between the automatic strategies and a user. The user is freed from performing repetitive work and can focus efforts on innovative and intuitive planning changes.

Finding an absolutely optimal plan given the current inputs is not of primary importance to most planners. Rather, it is more important to modify a plan in place previously in response to changes such that the plan is still feasible and meets certain desirability criteria and that there is least disturbance to the operations. There are a large number of plans that are reasonably close to an optimal plan, any one of which can be acceptable. One real problem posed by planning a user environment is the ongoing process of maintaining a feasible plan that remains reasonably near an optimal plan. The present invention provides benefits in such planning by allowing cooperation of both automated and manual planning techniques and by allowing infeasible plans to exist and be adjusted to feasible plans.

According to the teachings of the present invention, the automated strategies work in cooperation with manual planning efforts rather than replacing them as with conventional planning systems. It is often unreasonable to assume that all necessary planning information can be available to a completely automated planning system. There may be more possibilities in the real world than a planning system can be programmed to take into account. Many of the most difficult decisions and trade-offs should be made by a user of the planning system. On the other hand, manufacturing and other planning efforts include many planning tasks efficiently addressed through the use of automated strategies.

Both manual and automatic adjustments to the plan are used to provide a well maintained plan. According to the teachings of the present invention, automated strategies executed by the planning system improve the existing plan by making adjustments without eliminating manual adjustments made by a user. Thus, a planning effort produced previously is not discarded due to new conditions.

A strategy driven problem oriented planning process identifies problems and then explores various strategies to adjust the current plan to alleviate those problems. According to the teachings of the present invention, this approach is used whether automated or manual adjustments to the current plan are performed. The problems that are identified can include conditions that violate feasibility, such as over-utilized resources, negative balances and inventories, and hard constraint violations. Conditions that affect the desirability of the current plan also can be identified as problems. These include such things as late orders, short orders, higher inventories and higher costs.

According to the teachings of the present invention, problems are identified, collected and classified according to type and severity. When the current plan is adjusted, the lists of problems are adjusted as well. These problem lists can be filtered as desired such as based upon type, area, severity, or tolerances. Filtering allows a user to obtain a list of problems that are most critical without being forced to search manually. After each planning adjustment, the user can immediately be shown new problems that were created in the current plan and any problems that remain.

According to the teachings of the present invention, automated strategies operate upon the problem-oriented paradigm. Each strategy defines which problems are to be addressed, which changes can be used to adjust the current plan to eliminate those problems, how to choose the best adjustments, and what adjustments are to be executed until a desired resolution is found.

Infeasible plans are allowed to be generated according to the teachings of the present invention. By allowing infeasible plans to exist, a more seamless integration between manual and automated efforts is accomplished that simplifies planning efforts. Infeasible plans can be beneficial to users of a planning system to determine whether changes should be made to the user environment in addition to making changes to a plan.

The use of automated strategies produces results that a user might obtain manually but does so much more quickly and efficiently. Invocation of strategies to take care of numerous, repetitive planning adjustments is understandable and natural for a user allowing integration with the user's manual planning efforts. In addition to displaying the list of remaining problems to the user, the planning system also can display strategies available to the user.

Importantly, the automated strategies do not attempt to generate a plan from scratch. Rather, the automated strategies address defined problems within an existing plan. Thus, previous planning decisions are not arbitrarily undone. A user can freely alternate between making manual adjustments and invoking automated strategies. Given this ability to integrate manual and automated changes, it becomes desirable for a user to invoke the automated strategies to perform specific tasks effectively handling a piece of the planning problem. The strategies are defined to provide the mechanism for successfully accomplishing this task.

Each strategy is a combination of a set of problems that the strategy is to resolve and a set of planning adjustments or changes that the strategy is allowed to use. Individual strategies can be defined, named and stored for future use by users of the planning system. In this way, libraries of strategies can be generated. Examples of problems that can be efficiently addressed by an automated strategy include over-utilized resources, heavily utilized resources, under-utilized resources, inventory below safety stock level, inventories below zero levels, excess inventory, late orders, early orders, high costs and other such problems. Tolerances also can be defined for each problem allowing less significant problems to be ignored. Tolerances can be time phased such that problems further in the future are ignored more often than near-term problems. Each strategy specifies a domain of problems to which the strategy applies. For example, the domain defines which order, resource, or inventory problems should be addressed. Thus, a strategy can resolve problems associated with one resource, a number of resources, inventory at a given location or other problems and combinations of problems. A strategy further defines which planning adjustment changes are allowed. For instance, an change may be to plan an operation earlier or later, to reduce a quantity (short order), to choose a resource, to combine, split or overlap operations, to split orders, or to perform other such changes.

A user may want to disallow a change defined by a strategy under some circumstances. For example, a user may want the strategy to try to balance a resource, but without making anything late or short. The strategy may specify that changes that make things later or reduce quantity cannot be performed. The strategy process must make due with the other possible changes.

Sequences of strategies may be composed together as multi-phase strategies. Each strategy in a multi-phase strategy is executed one after another. Manual phases can be included in a multi-phase strategy such that the automated strategy is paused for a user to consider performing some manual planning change. Different users may develop their own multi-phase strategies that they find effective in different situations. Further, these strategies can be shared with other planners. Multiphase strategies can also be used to take advantage of special characteristics of a manufacturing plant or other user environment. For example, some process flow scheduling manufacturers are more effective if they can plan various stages in a certain order. Each stage can be addressed by a different phase of a strategy, where the multi-phase strategy includes the proper ordering of the strategies.

According to the teachings of the present invention, a strategy driven planning system provides a user with a high level of control over automated strategies. The flow of the planning effort is effectively programmable through the definition of strategies that include what the user would like to achieve and by what changes the goal can be met. These strategies, coupled with a problem-oriented plan analysis, allows manual and automated changes to be intermixed. Manual steps which essentially pause and wait for a user to do some manual work can be added to script what a planner should do. A planner is enabled to use strategies to automate groups of changes that otherwise the planner would be required to accomplish manually.

One technical advantage of the present invention is the cooperative integration of manual and automated planning and integration across successive planning efforts of an ongoing planning process.

A further technical of the present invention is the definition and use of strategies including a plan domain, problem selection criteria, a change selection criteria, plan optimality criteria, search criteria, termination criteria, and sub-strategies, to automate resolution of problems identified in a given plan. These strategies can be invoked manually or in multi-phase strategies by a user of the planning system in order to automate resolution of infeasibilities and progress towards an optimal plan.

Another technical advantage of the present invention is the provision of strategies that allow a human planner to specify to the process of what to do next, what not to do next, how optimal is defined, and when to stop. In addition, sub-strategies allow human planners to create full scripts to coordinate the planing process. The problem-oriented nature highlights exceptions for the human planner to address. Further, the automated processes also address the exceptions in the same sort of flow a human planner would use. This makes it transparent and understandable to a human planner which are difficult properties to achieve in such complex processes but are very valuable for such cooperative applications.

Although the present invention has been described in detail, it should be understood that various changes, substitutions and alterations can be made hereto without departing from the spirit and scope of the invention as defined by the appended claims.

What is claimed is:

1. A strategy driven planning system for automatic execution of planning strategies, comprising:

a plan defining a scheduled operation of a user environment;

an environment defining behavior and constraints of the user environment;

a plurality of automatic strategies, each automatic strategy defining a plan domain, problem selection criteria, plan optimality criteria and termination criteria;

each plan domain defining a portion of the plan that the automatic strategy can adjust;

each problem selection criteria defining problems within the plan domain that the automatic strategy can attempt to resolve;

each plan optimality criteria defining a level of optimality to be achieved by the automatic strategy; and each termination criteria defining a termination point for execution of the automatic strategy;

a planning engine operable to access the plan, the environment and the plurality of automatic strategies, the planning engine further operable to identify a plurality of problems by comparing the plan to the behavior and constraints defined by the environment, and operable to execute a selected automatic strategy and to adjust the plan according to the selected automatic strategy; and a user interface coupled to the planning engine, the user interface operable to allow a user to interact with the planning engine in order to select and initiate execution of the selected automatic strategy.

2. The system of claim 1, wherein each automatic strategy further defines change selection criteria and search criteria, each change selection criteria defining adjustments that the automatic strategy can make to the plan, and each search criteria defining parameters for the automatic strategy to identify problems.

3. The system of claim 1, wherein the planning engine is operable to identify problems that comprise feasibility problems and desirability problems.

4. The system of claim 1, wherein at least one automatic strategy in the plurality of automatic strategies comprises at least one sub-strategy.

5. The system of claim 4, wherein the sub-strategy comprises an automated sequence of strategies.

6. The system of claim 4, wherein the sub-strategy includes a manual strategy.

7. The system of claim 1, wherein the planning engine is further operable to allow execution of a manual strategy.

8. The system of claim 1, wherein the user environment comprises a manufacturing plant and the plan comprises a scheduled operation of the manufacturing plant.

9. The system of claim 8, wherein the behavior and constraints comprise limits of capacity and resources in the manufacturing plant.

10. The system of claim 9, wherein the plurality of problems comprise identified instances where scheduled operation of the manufacturing plant violates limits of capacity and resources in the manufacturing plant.

11. The system of claim 8, wherein the behavior and constraints comprise limits of buffers and material flow in the manufacturing plant.

12. The system of claim 11, wherein the plurality of problems comprise identified instances where scheduled operation of the manufacturing plant violates limits of buffers and material flow in the manufacturing plant.

13. The system of claim 8, wherein the behavior and constraints comprise limits of capacity and transportation resources in a distribution network.

14. The system of claim 13, wherein the plurality of problems comprise identified instances where scheduled operation of the manufacturing plant violates limits of capacity and resources in the manufacturing plant.

15. The system of claim 8, wherein the behavior and constraints comprise limits of buffers and material flow through a distribution network.

16. The system of claim 15, wherein the plurality of problems comprise identified instances where scheduled operation of the manufacturing plant violates limits of buffers and material flow in the manufacturing plant.

17. A digital computer executing a software system for automatic execution of planning strategies, comprising:
   a data storage device operable to store data representing a plan, an environment and a plurality of automatic strategies, wherein the plan defines a scheduled operation of a user environment, the environment defines behavior and constraints of the user environment, and each of the plurality of automatic strategies defines a plan domain, problem selection criteria, plan optimality criteria, and termination criteria;
   each plan domain defining a portion of the plan that the automatic strategy can adjust;
   each problem selection criteria defining problems within the plan domain that the automatic strategy can attempt to resolve;
   each plan optimality criteria defining a level of optimality to be achieved by the automatic strategy; and
   each termination criteria defining a termination point for execution of the automatic strategy;
   an execution memory operable to store data representing a software system;
   a display operable to provide a user interface to a user to allow a user to select and initiate execution of an automatic strategy; and
   a processor coupled to the data storage device, the execution memory and the display, the processor executing the software system to provide;
   a planning engine operable to identify a plurality of problems by comparing the plan to the behavior and constraints defined by the environment and operable to execute the selected automatic strategy and to adjust the plan automatically according to the selected automatic strategy.

18. The digital computer of claim 17, wherein the data storage device comprises at least one magnetic data storage device.

19. The digital computer of claim 17, wherein the data storage device comprises at least one memory device.

20. The digital computer of claim 17, wherein the user interface provided by the display comprises a graphical user interface.

21. The digital computer of claim 17, wherein the planning engine is operable to identify problems that comprise feasibility problems and desirability problems.

22. The digital computer of claim 17, wherein at least one strategy in the plurality of strategies comprises at least one sub-strategy.

23. The digital computer of claim 17, wherein the data storage device is further operable to store data representing a manual strategy and the planning engine is operable to allow execution of the manual strategy.

24. A method of automatically operating a strategy driven planning system in a digital computer to execute planning strategies, comprising:
   providing a plan defining a scheduled use of a user environment;
   providing an environment defining behavior and constraints of the user environment;
   providing a plurality of automatic strategies each defining a plan domain, problem selection criteria, plan optimality criteria, and termination criteria;
   each plan domain defining a portion of the plan that the automatic strategy can adjust;
   each problem selection criteria defining problems within the plan domain that the automatic strategy can attempt to resolve;
   each plan optimality criteria defining a level of optimality to be achieved by the automatic strategy; and
   each termination criteria defining a termination point for execution of the automatic strategy;
   identifying a plurality of problems by comparing the plan with the behavior and constraints defined by the environment;
   executing a selected automatic strategy and adjusting the plan according to the selected automatic strategy; and
   repeating the steps of identifying and executing to create an acceptable plan.

25. The method of claim 24, wherein providing a plurality of automatic strategies comprises providing automatic strategies each further defining change selection criteria and search criteria, each chance selection criteria defining adjustments that the automatic strategy can make to the plan, and each search criteria defining parameters for the automatic strategy to identify problems.

26. The method of claim 24, wherein identifying comprises generating a list of problems that comprise feasibility problems and desirability problems.

27. The method of claim 24, wherein providing a plurality of automatic strategies comprises providing at least one automatic strategy that comprises at least one sub-strategy.

28. The method of claim 24, further comprising allowing execution of a manual strategy.

29. The method of claim 24, wherein executing a selected automatic strategy and adjusting the plan comprises the steps of:

identifying problems in the plan domain of the selected automatic strategy;

selecting problems according to the problem selection criteria of the selected automatic strategy;

selecting a problem to resolve;

selecting an allowed change according to the change selection criteria of the selected automatic strategy;

executing the selected change;

identifying problems with the adjusted plan;

returning to the step of selecting an allowed change if the number of problems was not reduced;

returning to the step of selecting an allowed change if allowed changes are exhausted; and returning to the step of selecting a problem to resolve if the problem subset is not resolved.

\* \* \* \* \*